United States Patent
Prakash et al.

(10) Patent No.: US 12,351,729 B2
(45) Date of Patent: Jul. 8, 2025

(54) RAPID CURING OF CURABLE COMPOSITIONS

(71) Applicant: The Boeing Company, Chicago, IL (US)

(72) Inventors: Om Prakash, Bangalore (IN); Megha Sahu, Bangalore (IN)

(73) Assignee: The Boeing Company, Arlington, VA (US)

(*) Notice: Subject to any disclaimer, the term of this patent is extended or adjusted under 35 U.S.C. 154(b) by 629 days.

(21) Appl. No.: 17/550,146

(22) Filed: Dec. 14, 2021

(65) Prior Publication Data

US 2022/0213344 A1  Jul. 7, 2022

Related U.S. Application Data

(60) Provisional application No. 63/133,923, filed on Jan. 5, 2021.

(51) Int. Cl.
| | | |
|---|---|---|
| *C09D 163/00* | (2006.01) | |
| *C08K 3/04* | (2006.01) | |
| *C09J 163/00* | (2006.01) | |

(52) U.S. Cl.
CPC .......... *C09D 163/00* (2013.01); *C09J 163/00* (2013.01); *C08K 3/042* (2017.05)

(58) Field of Classification Search
CPC ......... C08G 59/50; C08K 3/042; C08L 63/00; C09D 163/00; C09J 163/00
See application file for complete search history.

(56) References Cited

FOREIGN PATENT DOCUMENTS

| | | | | |
|---|---|---|---|---|
| CN | 104201251 A | * | 12/2014 | ........... H01L 31/048 |
| CN | 106867363 A | * | 6/2017 | ............. C08G 59/46 |
| CN | 108943898 A | * | 12/2018 | |
| CN | 111218090 A | * | 6/2020 | |
| CN | 111944469 A | * | 11/2020 | ............. C09J 11/04 |
| IN | 201611009248 | | 1/2018 | |

OTHER PUBLICATIONS

CN-111218090-A (Jun. 2, 2020) machine translation.*
CN-106867363-A (Jun. 20, 2017) machine translation.*
CN-104201251-A (Dec. 10, 2014) machine translation.*
CN-108943898-A Dec. 7, 2018 (machine translation).*
CN-111944469-A Nov. 17, 2020 (machine translation).*

* cited by examiner

*Primary Examiner* — Ana L. Woodward
(74) *Attorney, Agent, or Firm* — Walters & Wasylyna LLC

(57) ABSTRACT

Curable compositions are provided. In embodiments, a curable composition comprises curable prepolymers selected from the group consisting of epoxy prepolymers and silicone prepolymers, and a curing rate modifier that increases a rate of crosslinking reactions between the curable prepolymers as compared to a comparative curable composition without the curing rate modifier, wherein the curing rate modifier does not cure the curable composition in the absence of a hardener present in the curable composition, a catalyst present in the curable composition, water, or a combination thereof. Methods of using the curable compositions are also provided.

20 Claims, 5 Drawing Sheets

RAPID CURING OF CURABLE COMPOSITIONS

CROSS REFERENCE TO RELATED APPLICATIONS

The present application claims priority to U.S. Provisional Patent Application No. 63/133,923 that was filed Jan. 5, 2021, the entire contents of which are incorporated herein by reference.

BACKGROUND

Curable compositions comprising curable prepolymers are used throughout many industries, e.g., to form structural parts, sealants, shims, paints, coatings, and the like. There are many different types of curable prepolymers which may be selected to achieve cured, crosslinked products having particular properties suited to the desired application. Despite this diversity, the step of curing is often the bottleneck in an overall manufacturing process. For example, many sealants and coatings can take as much as a day to cure before they can be used in a subsequent step of the manufacturing process. This greatly limits the rate of production and increases manufacturing costs.

SUMMARY

Provided herein are curable compositions having rapid curing rates. Methods for using the curable compositions are also provided.

In one aspect, a curable composition is provided. In an embodiment 1, a curable composition comprises curable prepolymers selected from the group consisting of epoxy prepolymers and silicone prepolymers, and a curing rate modifier that increases a rate of crosslinking reactions between the curable prepolymers as compared to a comparative curable composition without the curing rate modifier, wherein the curing rate modifier does not cure the curable composition in the absence of a hardener present in the curable composition, a catalyst present in the curable composition, water, or a combination thereof.

In an embodiment 2, the curable composition is according to embodiment 1, wherein the curing rate modifier is in the form of nanostructures.

In an embodiment 3, the curable composition is according to embodiment 2, wherein the nanostructures are planar nanostructures.

In an embodiment 4, the curable composition is according to any of embodiments 1-3, wherein the curing rate modifier forms covalent bonds with a hardener present in the curable composition or with the curable prepolymers.

In an embodiment 5, the curable composition is according to embodiment 4, further comprising the hardener and wherein the curing rate modifier forms covalent bonds with the hardener.

In an embodiment 6, the curable composition is according to any of embodiments 1-5, wherein the curing rate modifier forms non-covalent bonds with the curable prepolymers.

In an embodiment 7, the curable composition is according to embodiment 6, wherein the non-covalent bonds are hydrogen bonds.

In an embodiment 8, the curable composition is according to any of embodiments 1-7, further comprising a hardener and wherein the curing rate modifier forms covalent bonds with the hardener and hydrogen bonds with the curable prepolymers.

In an embodiment 9, the curable composition is according to embodiment 1, wherein the curing rate modifier increases a diffusion rate of water molecules in a vicinity of the curing rate modifier as compared to the diffusion rate of water in the comparative curable composition.

In an embodiment 10, the curable composition is according to embodiment 1, wherein the curing rate modifier is a graphene-based material.

In an embodiment 11, the curable composition is according to embodiment 10, wherein the graphene-based material is graphene oxide.

In an embodiment 12, the curable composition is according to any of embodiments 10-11, wherein the graphene-based material is functionalized.

In an embodiment 13, the curable composition is according to embodiment 12, wherein the graphene-based material is functionalized with amine molecules.

In an embodiment 14, the curable composition is according to embodiment 13, wherein the amine molecules are alkyl diamines.

In an embodiment 15, the curable composition is according to embodiment 13, wherein the amine molecules are selected from the group consisting of N,N'-dimethyl-1,6-hexanediamine, 1-(2-aminoethyl) piperazine, 3-dimethylamino propylamine, and 1,3-propane diamine.

In an embodiment 16, the curable composition is according to embodiment 1, wherein the curing rate modifier is a hydrophilic polymeric material.

In an embodiment 17, the curable composition is according to embodiment 1, wherein the curable prepolymers are the epoxy prepolymers, the curable composition further comprises a hardener, and the curing rate modifier is a graphene-based material.

In an embodiment 18, the curable composition is according to embodiment 17, wherein the graphene-based material is functionalized with amine molecules.

In an embodiment 19, the curable composition is according to embodiment 18, wherein the amine molecules are selected from the group consisting of N,N'-dimethyl-1,6-hexanediamine, 1-(2-aminoethyl) piperazine, 3-dimethylamino propylamine, and 1,3-propane diamine.

In an embodiment 20, the curable composition is according to any of the embodiments 1-19, wherein the curing rate modifier achieves an increase in the rate of crosslinking reactions of at least 3%.

In another aspect, a method of using a curable composition is provided. In an embodiment 21, the method comprises applying heat to the curable composition according to any of embodiments 1-20 to induce crosslinking reactions between curable prepolymers and convert the curable composition to a cured, crosslinked state or exposing the curable composition to water to induce crosslinking reactions between curable prepolymers and convert the curable composition to a cured, crosslinked state, or both.

In an embodiment 22, the curable composition is according to any of embodiments 1-20, wherein the curable composition is a component of a composition selected from the group consisting of a paint, a sealant, and a composite.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Definitions

Figure 1:
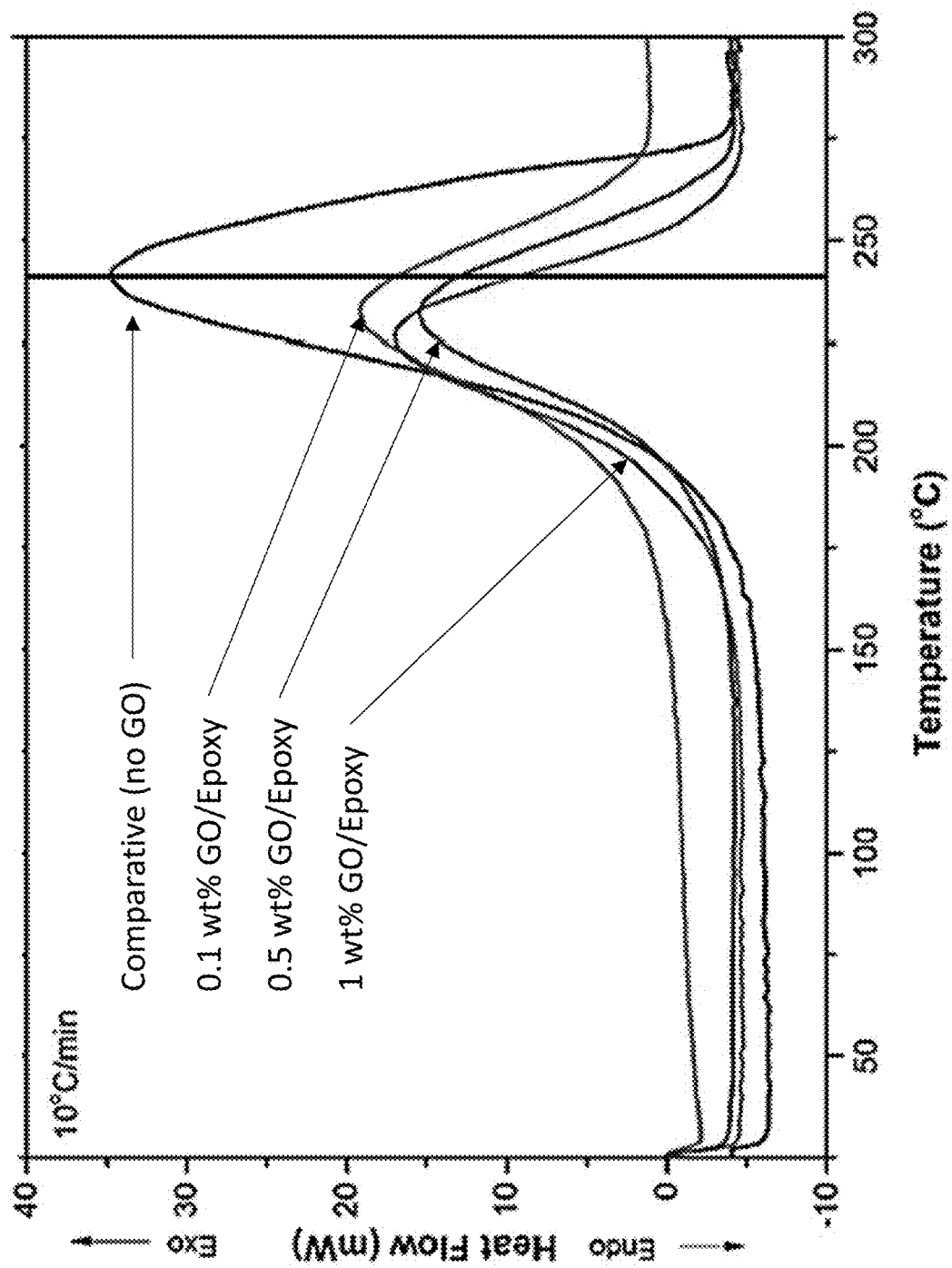
FIG. 1 shows differential scanning calorimetry (DSC) curves for illustrative curable compositions comprising graphene oxide and for a comparative composition (no graphene oxide).

The phrase "alkyl" and the like refer to a linear, branched or cyclic alkyl group in which the number of carbons may range from, e.g., 1 to 24, 1 to 12, 1 to 6, or 1 to 4. The alkyl group may be unsubstituted, by which it is meant the alkyl group contains no heteroatoms. The alkyl group may be substituted, by which it is meant an unsubstituted alkyl group in which one or more bonds to a carbon(s) or hydrogen(s) are replaced by a bond to non-hydrogen and non-carbon atoms.

The phrase "alkenyl" and the like refers to a mono- or polyunsaturated, linear, branched or cyclic alkenyl group in which the number of carbons may range from, e.g., 2 to 24, 2 to 12, 2 to 6, etc. The alkenyl group may be unsubstituted or substituted as described above with respect to alkyl groups.

The phrase "aryl" and the like refers to a monocyclic aryl group having one aromatic ring or a polycyclic group having fused aromatic rings (e.g., two, three, etc. rings). Monocyclic aryl groups may be unsubstituted or substituted as described above with respect to alkyl groups. However, substituted monocyclic aryl groups also refer to an unsubstituted monocyclic aryl group in which one or more carbon atoms are bonded to an unsubstituted or substituted alkane, an unsubstituted or substituted alkene, or an unsubstituted or substituted monocyclic aryl group or a polycyclic aryl group. The meaning of unsubstituted and substituted alkanes and unsubstituted and substituted alkenes follows the meaning described above for unsubstituted and substituted alkyl and alkenyl groups, respectively. Polycyclic aryl groups are unsubstituted.

The phrase "carboxylic acid" and the like refers to a group having the formula R—COOH in which R is an alkyl group as described above. The group may be in its protonated or unprotonated form (i.e., carboxylate).

The phrase "amine" and the like refers to a group having the formula $NR_3$ in which each R is independently selected from hydrogen, an alkyl group, and an aryl group as described above. Polyfunctional amines have more than one amine group.

The phrase "epoxide" and the like refers to a group in the form of a three-membered ring having an oxygen atom attached to two adjacent carbon atoms. The carbon atoms may be bound to any combination of hydrogen, an alkyl group, and an alkenyl group as described above.

The phrase "silanol" and the like refers to a group having the formula SiOH.

The phrase "siloxy" and the like refers to a group having the formula $R_3SiO$ in which each R is independently selected from hydrogen, halogen, alkyl group, alkenyl group, and aryl group as described above.

In one aspect, the present disclosure provides curable compositions. The curable compositions comprise a curing rate modifier having certain characteristics which allow it to increase the rate of crosslinking reactions involving curable prepolymers also present in the curable composition. In the present disclosure, the phrase "crosslinking reactions" and the like refers to the formation of covalent bonds (i.e., crosslinks) between curable prepolymers. In the present disclosure, the phrase "increase the rate" and the like refers to the rate of these crosslinking reactions at a particular temperature of the curable composition. For crosslinking reactions which are induced by the application of heat in order to raise the temperature of the curable composition to a curing temperature, this particular temperature may be the curing temperature. In the present disclosure, the phrase "curing temperature" and the like refers to the temperature at which all or most (e.g., at least 90%, at least 95%, or at least 98%) of the crosslinks have formed in the curable composition, thereby converting the curable composition to a cured, crosslinked material. For crosslinking reactions which do not require the application of heat, this particular temperature may be room temperature (i.e., 20° C. to 25° C.). Since the curing rate modifier increases the rate of crosslinking, the curing temperature of the curable composition may be lowered relative to the curing temperature of a comparative curable composition. In the present disclosure "comparative curable composition" and the like refers to a composition having the same composition as the curable composition and formed the same way but without the curing rate modifier. Increases in curing rate, decreases in curing temperatures, as well as the degree of crosslinking (i.e., degree of conversion to the cured, crosslinked state) may be determined using differential scanning calorimetry (DSC), as described in the Example, below.

In embodiments, the curing rate modifier is a nanostructured material. By "nanostructured" it is meant that the material is in the form of distinct, distinguishable nanostructures having at least one (of three) dimensions of 100 nm or less. The phrase "nanostructured material" is distinguished from discrete, individual, small molecules. The nanostructures of the nanostructured material may be characterized by their shape and dimensions. In embodiments, the nanostructures have a planar, i.e., sheet-like, morphology in which one of the dimensions (which may be referred to as a thickness) is less than 100 nm, less than 50 nm, less than 25 nm, or less than 10 nm. The planar nanostructures may be composed of one to 2, 3, or 4 atomic or molecular layers of the element/molecule from which the nanostructure is composed. Thus, the thickness of the planar nanostructures may be in a range of from 1 atomic/molecular layer to 100 nm, from 1 nm to 100 nm, from 10 nm to 100 nm, or from 1 nm to 10 nm. The other two dimensions of the planar nanostructures may be substantially greater than the thickness, e.g., 25 times greater, 50 times greater, 100 times greater, 200 times greater, 500 times greater, or 1000 times greater. These other two dimensions may be of similar magnitude to each other. These other two dimensions may be referred to as a length and width, but these terms are not meant to imply that the planar nanostructures are limited to rectangular shapes.

Other shapes, including irregular shapes may be used. Planar nanostructures may be referred to as "nanosheets."

The dimensions of the nanostructures provided above may be average values, by which it is meant an average value over a representative number of nanostructures. Techniques such transmission electron microscopy (TEM) may be used to determine the shapes and average dimensions of the nanostructures.

In embodiments, the composition of the curing rate modifier is one that forms covalent bonds with other components of the curable composition. This is due to the chemical nature of the element/molecule from which the curing rate modifier is composed, including functional groups which may present in the curing rate modifier. By way of illustration, such functional groups include carboxylic acid groups and amine groups. The formation of the covalent bonds may refer to formation under the conditions in which the curable composition is cured to form a cured, crosslinked material. These conditions depend upon the curable prepolymers in the curable composition and the mechanism by which the crosslinking occurs, all of which are further described below. The components of the curable compositions which may be covalently bound to the curing rate modifier include a hardener present in the curable compositions. By way of illustration, curing rate modifiers comprising carboxylic acid groups may form amide bonds with hardeners comprising amine groups. As another example, curing rate modifiers comprising amine groups may form covalent bonds with curable prepolymers comprising epoxide groups.

In embodiments, the composition of the curing rate modifier is one that forms non-covalent bonds with other components of the curable compositions. Again, this is due to the chemical nature of the element/molecule from which the curing rate modifier is composed, including functional groups which may be present in the curing rate modifier. The non-covalent bonds may be hydrogen bonds. The formation of the non-covalent bonds may refer to formation under the conditions in which the curable composition is cured to form a cured, crosslinked material. The components of the curable compositions which may be non-covalently bound to the curing rate modifier include a curable prepolymer. By way of illustration, curing rate modifiers comprising carboxylic acid groups may form hydrogen bonds with curable prepolymers comprising epoxide groups.

In embodiments, the composition of the curing rate modifier is one that forms both covalent bonds and non-covalent bonds with other components of the curable compositions, e.g., a hardener (e.g., via amide bonds) and a curable prepolymer (e.g., via hydrogen bonds), respectively.

Although the curing rate modifier may form covalent/non-covalent bonds with components of the curable composition, the curing rate modifier generally does not, itself, form a cured, crosslinked material, under the conditions applied to induce curing/crosslinking. These conditions refer to those that would be applied to induce curing/crosslinking in a comparative curable composition (defined above). This is illustrated in the Example below, showing that a curable composition comprising graphene oxide (curing rate modifier) and epoxy prepolymers does not cure/crosslink the epoxy prepolymers, unless a hardener is also present. (See FIG. 2.)

In embodiments, the curing rate modifier is one that increases the diffusion rate of water molecules in the vicinity of the curing rate modifier. The phrase "in the vicinity" encompasses water molecules within 0.1 nm to within 20 nm of the curing rate modifier, but also includes water molecules in direct contact with the curing rate modifier. The phrase also refers to the water diffusion rate at a particular temperature of the curable composition, e.g., the curing temperature or room temperature. The standard equations describing gas permeability in polymer blends may be used to estimate the increase in diffusion rate of water in the curable compositions. Specifically, the curable prepolymers may be considered to be the matrix phase while the curing rate modifier may be considered to be the modifier phase. Water will diffuse faster through certain curing rate modifiers such as the hydrophilic polymers (modifier phase) described below, as compared to the curable prepolymers (matrix phase), thereby increasing the overall permeability of the curable composition.

In embodiments, the curing rate modifier is a graphene-based material. In the present disclosure, the term "graphene-based" encompasses graphene and graphene oxide. The graphene/graphene oxide may be unfunctionalized (i.e., comprising no functional groups other than those inherently present) or functionalized. The graphene-based material may be in the form of planar nanostructures having the shapes and dimensions as described above. Regarding unfunctionalized graphene-based material, as noted above, this encompasses unfunctionalized graphene oxide which inherently comprises oxygen containing groups such as carboxylic acid groups. Regarding functionalized graphene-based materials, this refers to the functionalization of unfunctionalized graphene/graphene-oxide with other molecules. Such other molecules include amine molecules to provide amine functional groups on the curing rate modifier as described above. The amine molecules may be alkyl diamine molecules, including cycloalkyl diamine molecules. Illustrative amine molecules include N,N'-dimethyl-1,6-hexanediamine, 1-(2-aminoethyl) piperazine, 3-dimethylamino propylamine, and 1,3-propane diamine. Graphene and graphene oxide may be synthesized using known methods or obtained commercially. Known methods may be used to functionalize graphene and graphene oxide.

In embodiments, the curing rate modifier is a hydrophilic polymeric material. As noted above, such curing rate modifiers are particularly useful in increasing the diffusion rate of water molecules in the vicinity of the curing rate modifier. The composition of the hydrophilic polymeric material is not particularly limited, provided it comprises moieties that facilitate the absorption and diffusion of water. Illustrative compositions include acrylics such as those based on acrylic acid and/or acrylamide; maleic anhydrides; copolymers of acrylics/maleic anhydrides; amine-functional polymers such as allylamine, ethyleneimine, and oxazoline; cellulose; polylatic acid; polyvinylacetate; polyvinyl pyrrolidone; and polyethylene glycol. The hydrophilic polymeric material desirably has a weight average molecular weight less than that of the curable prepolymers in the curable composition. However, since the polymers of the hydrophilic polymeric material are extended chains of monomers, the material is also distinguished from discrete, individual, small molecules. The morphology of the hydrophilic polymeric material may be that of a network of elongated chains dispersed through the curable composition.

As noted above, the curing rate modifiers are generally not small molecules. As such, they are distinguished from a hardener which may be used in the present curable compositions, including the hardeners described herein. Similarly, the curing rate modifier is distinguished from any catalysts which may be used in the present curable compositions, including the catalysts described herein.

The amount of the curing rate modifier in the present curable compositions may be selected to achieve a desired increase in curing rate/desired decrease in the curing temperature. In embodiments, the curing rate modifier is present at an amount in a range of from 0.1% to 10% by weight as compared to the total weight of the curable composition. This includes a range of from 0.5% to 8% by weight and from 1% to 6% by weight. Combinations of different types of curing rate modifiers may be used; in such cases, the amounts refer to the total amount of curing rate modifiers.

The present curable compositions further comprise curable prepolymers. In the present disclosure, the phrase "curable prepolymers" refers to monomers, oligomers, polymers, or combinations thereof, in an uncrosslinked state. Upon application of certain conditions, the curable prepolymers undergo crosslinking reactions to form a cured, crosslinked product. Suitable curable prepolymers include those which form thermosets in their cured, crosslinked state. Illustrative thermosets include epoxies and silicones.

In embodiments, the curable prepolymers comprise epoxy prepolymers comprising epoxide groups. The types of such epoxy prepolymers are not particularly limited, but may include those that form bisphenol-based epoxies, novolac-based epoxies, aliphatic epoxies, halogenated epoxies, and glycidylamine epoxies. In embodiments, the epoxy prepolymers are those that form bisphenol-based epoxies, i.e., bisphenol-based epoxy prepolymers. The epoxy prepolymers may be multifunctional, including trifunctional and tetrafunctional.

Crosslinking/curing of the epoxy prepolymers generally involves the reaction between epoxide groups of the epoxy prepolymers to form covalent crosslinks therebetween (i.e., homopolymerization) and/or the reaction between epoxide groups of the epoxy prepolymers and a hardener comprising a reactive hydrogen to form covalent crosslinks therebetween. Hardeners which can react with epoxide groups include a variety of polyfunctional amines (including alkyl amines, cycloalkyl amines, aromatic amines); acids; anhydrides; phenols; alcohols; and thiols. Combinations of different types of hardeners may be used. These hardeners are small molecules and as noted above, are distinguished from the curing rate modifiers of the present curable compositions. That is, the present curing rate modifiers are not polyfunctional amines; acids; anhydrides; phenols; alcohols; or thiols.

Catalysts may be included in the present curable compositions, including those comprising epoxy prepolymers. However, in embodiments, no such catalysts are included. Catalysts which catalyze reactions involving epoxide groups of epoxy prepolymers include a variety of tertiary amines, carboxylic acids, alcohols, imidazoles, and boron trifluoride. Combinations of different types of catalysts may be used. These catalysts are small molecules and as noted above, are distinguished from the curing rate modifiers of the present curable compositions. That is, the present curing rate modifiers are not tertiary amines, carboxylic acids, alcohols, imidazoles, or boron trifluoride.

The conditions under which the crosslinking reactions may be induced to cure epoxy prepolymers may refer to the application of heat to increase the temperature of the curable composition to the curing temperature. The curing temperature may be at least 100° C., at least 150° C., at least 200° C., at least 250° C., at least 275° C., at least 300° C. or in a range of from 100° C. to 300° C., from 200° C. to 275° C., or from 225° C. to 250° C. As noted above, since the curing rate modifier increases the curing rate, these curing temperatures may be lower than the curing temperature of a comparative curable composition (defined above). However, in embodiments, the crosslinking reactions may occur at room temperature, e.g., if a hardener and/or a catalyst is added. Thus, the conditions may simply involve adding any of the disclosed hardeners and/or catalysts to the curable composition.

In embodiments, the curable prepolymers comprise silicone prepolymers comprising silanol groups, siloxy groups, or both, which generally form silicones via condensation reactions. Crosslinking/curing of such silicone prepolymers generally involves the reaction between silanol groups of the silicone prepolymers and a hardener comprising a siloxy group to form covalent crosslinks therebetween. Illustrative such hardeners include a variety of silanes such as acetoxy silanes (e.g., methyl triacetoxysilane), alkoxy silanes (e.g., methyl trimethoxy silane), enoxy silanes, ester silanes (e.g., alkyl orthosilicate esters), oximo silanes, amino silanes, and benzamide silanes. Combinations of different types of hardeners may be used. These hardeners are small molecules and as noted above, are distinguished from the curing rate modifiers of the present curable compositions.

As noted above, catalysts may be included in silicone curable compositions. Catalysts which catalyze the condensation reactions of silicone prepolymers include a variety of tin compounds (e.g., stannous octoate, dibutyltin dilaurate, organotitanates). Combinations of different types of catalysts may be used. These catalysts are small molecules and as noted above, are distinguished from the curing rate modifiers of the present curable compositions. That is, the present curing rate modifiers are not tin compounds (e.g., stannous octoate, dibutyltin dilaurate, organotitanates).

Similar to epoxy prepolymers, the conditions under which crosslinking reactions may be induced to cure silicone prepolymers may refer to the application of heat to increase the temperature of the curable composition to the curing temperature. However, in embodiments, the crosslinking reactions may occur at room temperature, e.g., if a hardener and/or a catalyst is added. Thus, the conditions may simply involve adding any of the disclosed hardeners and/or catalysts to the curable composition. In addition, crosslinking reactions may occur upon exposing the curable composition to water, including water present in the ambient atmosphere. In such cases, water hydrolyzes siloxy groups of silicone prepolymers and/or hardeners, thereby inducing the condensation reactions which form the covalent crosslinks. Thus, the conditions may simply involve exposing the curable composition to water, including water present in the ambient atmosphere.

The type of curable prepolymers, hardener(s), and catalyst(s) and the amounts of these components depends upon the desired properties and application for the cured, crosslinked product. However, in embodiments, the curable prepolymers are present in an amount in a range of from 40% to 90% by weight as compared to the total weight of the curable composition. This includes an amount in a range of from 50% to 80% by weight and from 60% to 70% by weight. The hardener, if present, is present in an amount in a range of from 10% to 60% by weight as compared to the total weight of the curable composition. This includes an amount in a range of from 20% to 50% by weight and from 30% to 40% by weight. The catalyst, if present, is present in an amount in a range of from 0.1% to 5% by weight as compared to the total weight of the curable composition. However, in embodiments, no catalyst is present. In both cases, if combinations of different types of hardeners/catalysts are used, the amounts refer to the total amount of hardeners/catalysts.

The present curable compositions may comprise other additives, e.g., filler(s), viscosity modifier(s), pigment(s). A variety of types of these components may be added in various amounts to tune the properties of the curable composition and the cured, crosslinked product formed therefrom. Illustrative amounts include an amount in a range of from 0.001% to 10% by weight as compared to the total weight of the curable composition. This includes from 0.01% to 5% by weight and from 0.1% to 1% by weight.

The present curable compositions may be formed by combining (in any order) and mixing the curing rate modifier, the curable prepolymers, and any other desired components at the desired amounts. Heat may be applied to facilitate mixing and dispersion of the various components. The curable compositions may be formulated as one-part or multi-part (e.g., two-part) systems. In one-part systems, all of the desired components are provided together in a single composition. In two-part systems, the desired components are provided in two or more separate compositions. By way of illustration, the curable prepolymers and the curing rate modifier may be provided as one composition and a hardener and/or catalyst in a separate, second composition.

In embodiments, the curable composition consists of one or more types of a curing rate modifier; one or more types of a curable prepolymer; optionally, one or more types of a hardener; optionally, one or more types of a catalyst; and optionally, one or more types of an additive. In embodiments, the curable composition consists of one or more types of a curing rate modifier; one or more types of a curable prepolymer; one or more types of a hardener; optionally, one or more types of a catalyst; and optionally, one or more types of an additive. In embodiments, the curable composition consists of one or more types of a curing rate modifier; one or more types of a curable prepolymer; one or more types of a hardener; one or more types of a catalyst; and optionally, one or more types of an additive. In embodiments, the curable composition consists of one or more types of a curing rate modifier; one or more types of a curable prepolymer; one or more types of a hardener; and optionally, one or more types of an additive. In these embodiments, any of the curing rate modifiers, the curable prepolymers, the hardeners, the catalysts, and the additives disclosed herein may be used in any combination without limitation.

In another aspect, the present disclosure provides methods of using any of the disclosed curable compositions. The methods involve inducing the crosslinking reactions in the curable compositions to form a cured, crosslinked product. The cured, crosslinked product may be referred to as a thermoset. As noted above, the conditions required to induce the crosslinking reactions depend upon the type of curable prepolymers as well as the formulation of the curable composition.

In embodiments, the crosslinking reactions are induced by applying heat to the curable composition. The heat may be applied to increase the curable composition's temperature to any of the temperatures disclosed herein. The heat may be applied according to a curing profile involving holds at certain temperatures (including the curing temperature) for certain periods of times. The curing profile may also involve use of certain heating rates to achieve the different temperatures. Various curing profiles may be used. An illustrative curing profile is 150° C. (2 hours), 180° C. (2 hours), 200° C. (2 hours). In embodiments, the crosslinking reactions are induced by exposing the curable composition to water. The water may be water present in the ambient atmosphere. In embodiments, the crosslinking reactions are induced by adding a hardener and/or a catalyst to a curable composition comprising a curing rate modifier and curable prepolymers and mixing. Any of the disclosed hardeners, catalysts, curing rate modifiers, and curable prepolymers may be used. Combinations of these techniques may be used as desired. The time of application of heat, exposure to water, mixing, etc. may be selected to achieve complete or nearly complete (e.g., at least 90%, at least 95%, or at least 98%) conversion of the curable prepolymers to the cured, crosslinked state.

The present curable compositions and methods of using the curable compositions may be characterized by the magnitude of the increase in curing rate they achieve in converting the curable prepolymers to a cured, crosslinked state. The increases may be relative to a comparative curable composition (defined above). The increases may be quantified using DSC as described in the Example, below. In such a quantification, the crosslinking reactions are induced by the same technique and under the same conditions for both the curable composition and the comparative curable composition. In embodiments, the increase in curing rate is at least 5%, at least 4%, at least 3%, or at least 2%. It is noted that even small increases in curing rate provide an enormous benefit in increasing manufacturing rates and reducing manufacturing costs. Increase in curing rate may be measured using DSC as described in the Example, below. (See FIG. 4.)

The curable compositions may be used in a variety of environments, including the aerospace industry, the automobile industry, the submarine industry, the electronics industry, the construction industry, and the like. The curable compositions may be used as a component of a paint, a sealant, or a composite. By way of illustration, the curable composition may be combined with carbon fibers to form a carbon fiber reinforced composite.

EXAMPLE

This Example demonstrates the use of a graphene-based curing rate modifier to increase the curing rate of a curable composition comprising epoxy prepolymers and a hardener.

A curable composition was prepared as follows. Bisphenol-based epoxy prepolymers were heated to a temperature of about 120° C. to reduce viscosity. Different amounts of graphene oxide (at the amounts noted below) were added while mixing (mechanical stirring) and maintaining the temperature of about 120° C. Ultrasonic stirring was applied to achieve a homogenous distribution of the graphene oxide throughout the epoxy prepolymers. A polyfunctional amine hardener was slowly added with mixing at an amount of 30% by weight as compared to the total weight of the curable composition. Comparative compositions were also formed, either with no graphene oxide or no hardener (as noted below).

FIG. 1 shows differential scanning calorimetry (DSC) curves for three curable compositions, each comprising the epoxy prepolymers, the hardener, and a different amount of graphene oxide (0.1%, 0.5%, and 1%, all by weight as compared to the total weight of the curable composition). The DSC curve for a comparative composition having the same composition but no graphene oxide (0% by weight graphene oxide) is also shown. The samples were heated at 10° C./min. The results clearly show that the peak of the DSC curves shift to the left as the amount of graphene oxide increases. In other words, the temperature at which curing/crosslinking occurs (i.e., the formation of covalent bonds between the hardener and the epoxy prepolymers) decreases as the amount of graphene oxide increases. The temperature at the peak may be referred to as the curing temperature as defined above. In particular, curing/crosslinking occurs at about 20° C. lower for the curable composition having 1% by weight graphene oxide as compared to the comparative curable composition at 0% by weight graphene oxide. This represents a significant increase in the curing rate due to the presence of graphene oxide.

Figure 2:
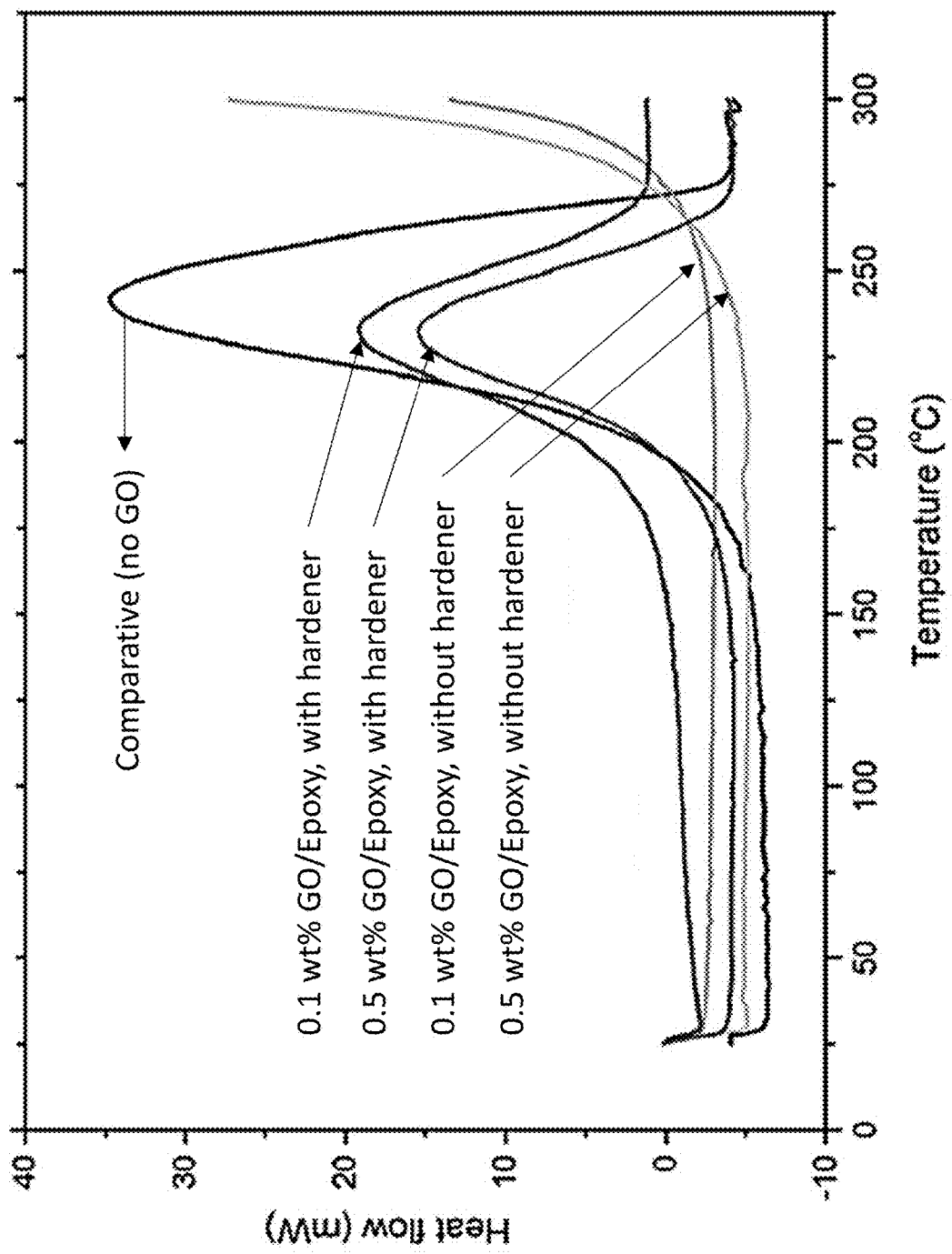
FIG. 2 shows DSC curves for illustrative curable compositions comprising graphene oxide and for three comparative compositions (either no hardener or no graphene oxide).

FIG. 2 shows DSC curves for two curable compositions, each comprising the epoxy prepolymers, the hardener, and a different amount of graphene oxide (0.1% and 0.5% by weight). DSC curves for three comparative compositions are also shown, including two which have the same composition but no hardener (0% by weight) and one which has the same composition (epoxy prepolymers/hardener) but no graphene oxide (0% by weight). The samples were heated at 10° C./min. Again, the results demonstrate that graphene oxide increases the curing rate. The results also establish that graphene oxide itself does not induce curing; i.e., crosslinking requires the presence of the hardener.

Figure 3:
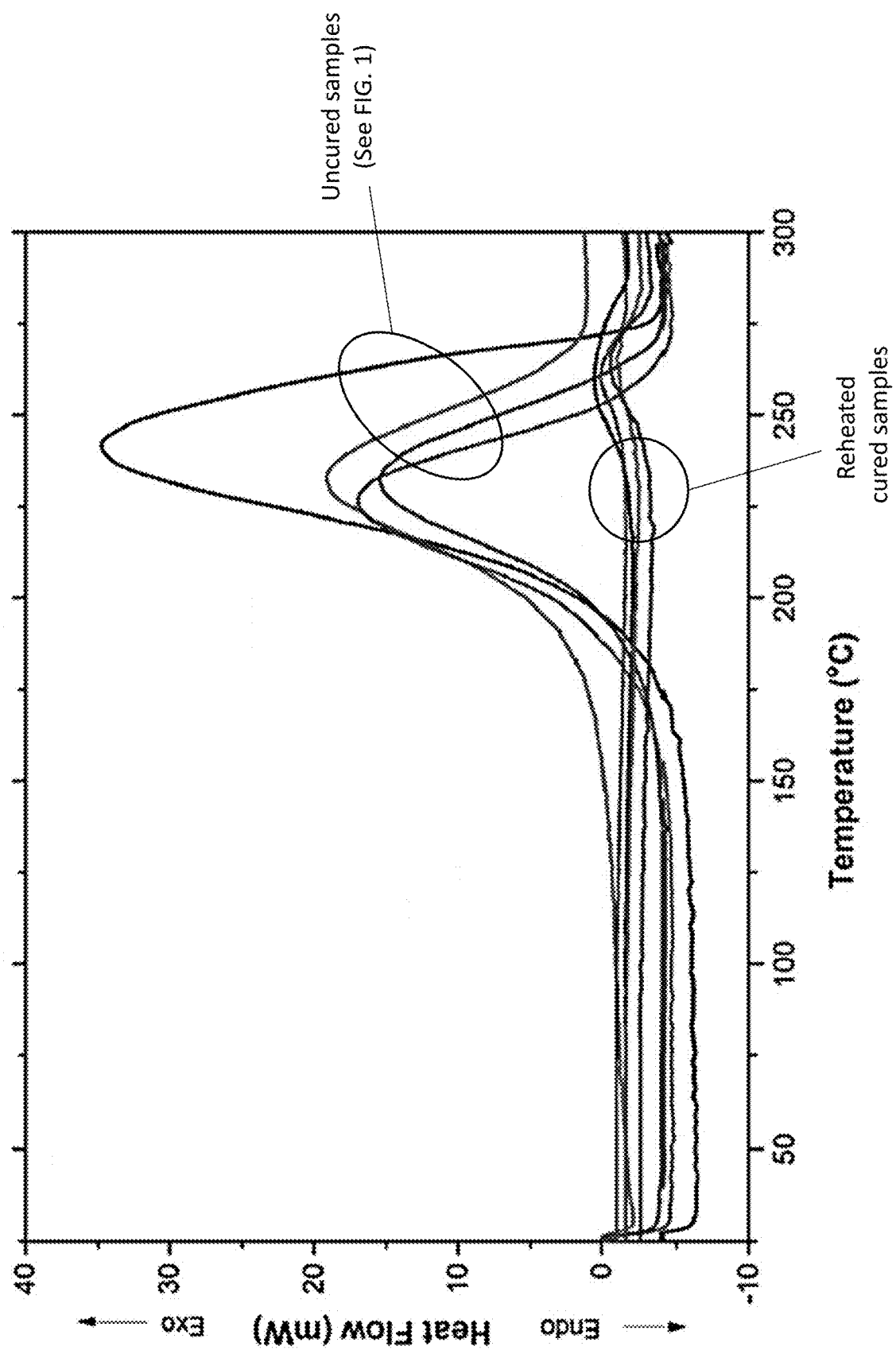
FIG. 3 overlays the DSC curves for the illustrative curable compositions of FIG. 1 with DSC curves obtained after reheating the cured samples.

FIG. 3 overlays the DSC curves of FIG. 1 with DSC curves for the same samples obtained after isothermal curing at 200° C., i.e., the reheated, cured samples. The comparison shows that the isothermal curing at 200° C. is nearly complete, i.e., the degree of crosslinking is ~100%.

Figure 4:
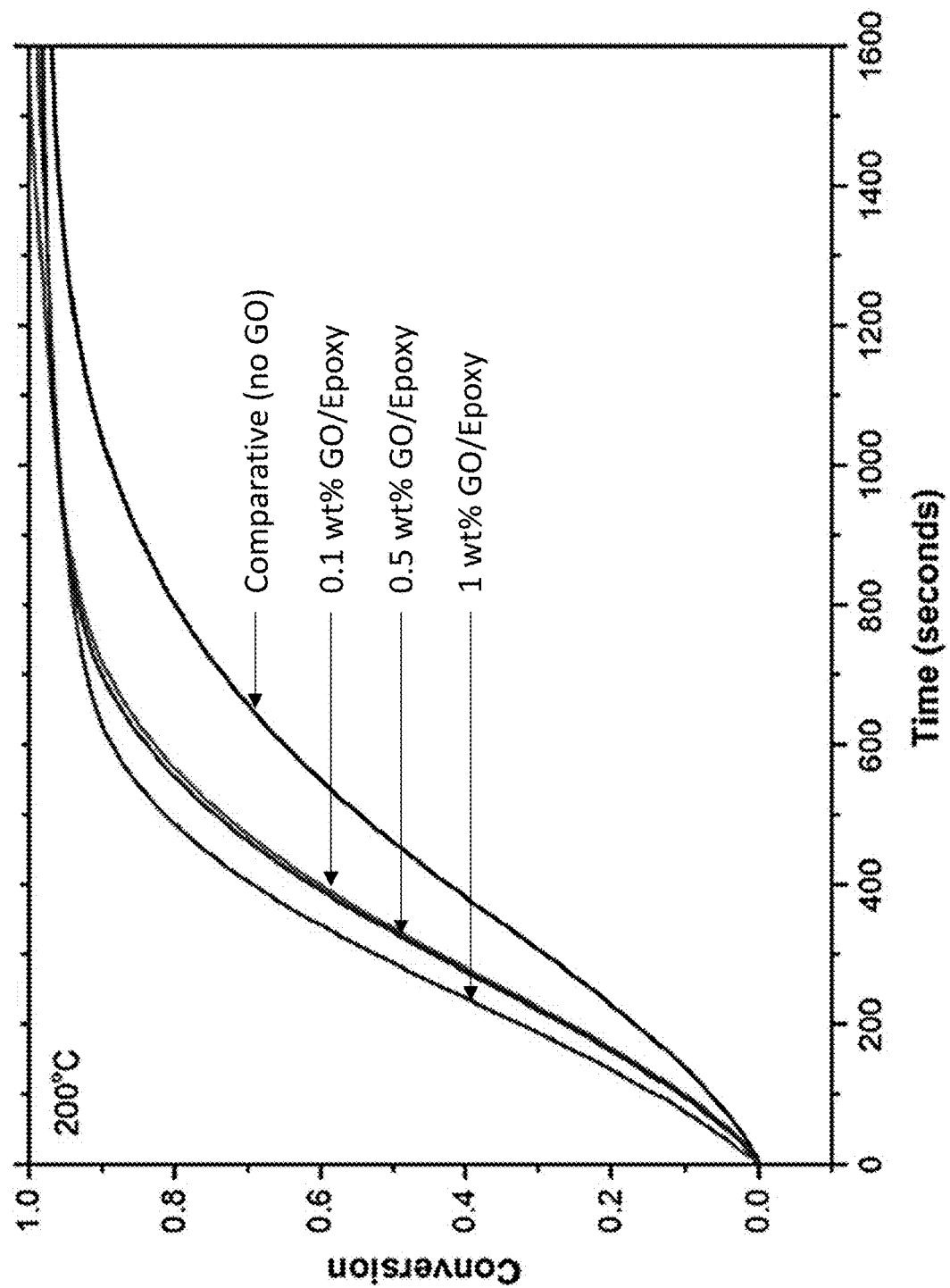
FIG. 4 is a plot of conversion of illustrative curable compositions comprising graphene oxide to the cured/crosslinked state as a function of time using isothermal heating at 200° C. A comparative composition is also shown (no graphene oxide).

FIG. 4 is a plot of conversion of the curable compositions to the cured/crosslinked state as a function of time using isothermal heating at 200° C. The same samples are shown as in FIG. 1, i.e., three curable compositions, each comprising the epoxy prepolymers, the hardener, and a different amount of graphene oxide (0.1%, 0.5%, and 1% by weight) and a comparative composition having the same composition but no graphene oxide (0% by weight graphene oxide). The results show that graphene oxide enables complete conversion (i.e., degree of crosslinking is ~100%) over the time scale examined and that the rate of curing/crosslinking increases as the amount of graphene oxide increases.

Figure 5:
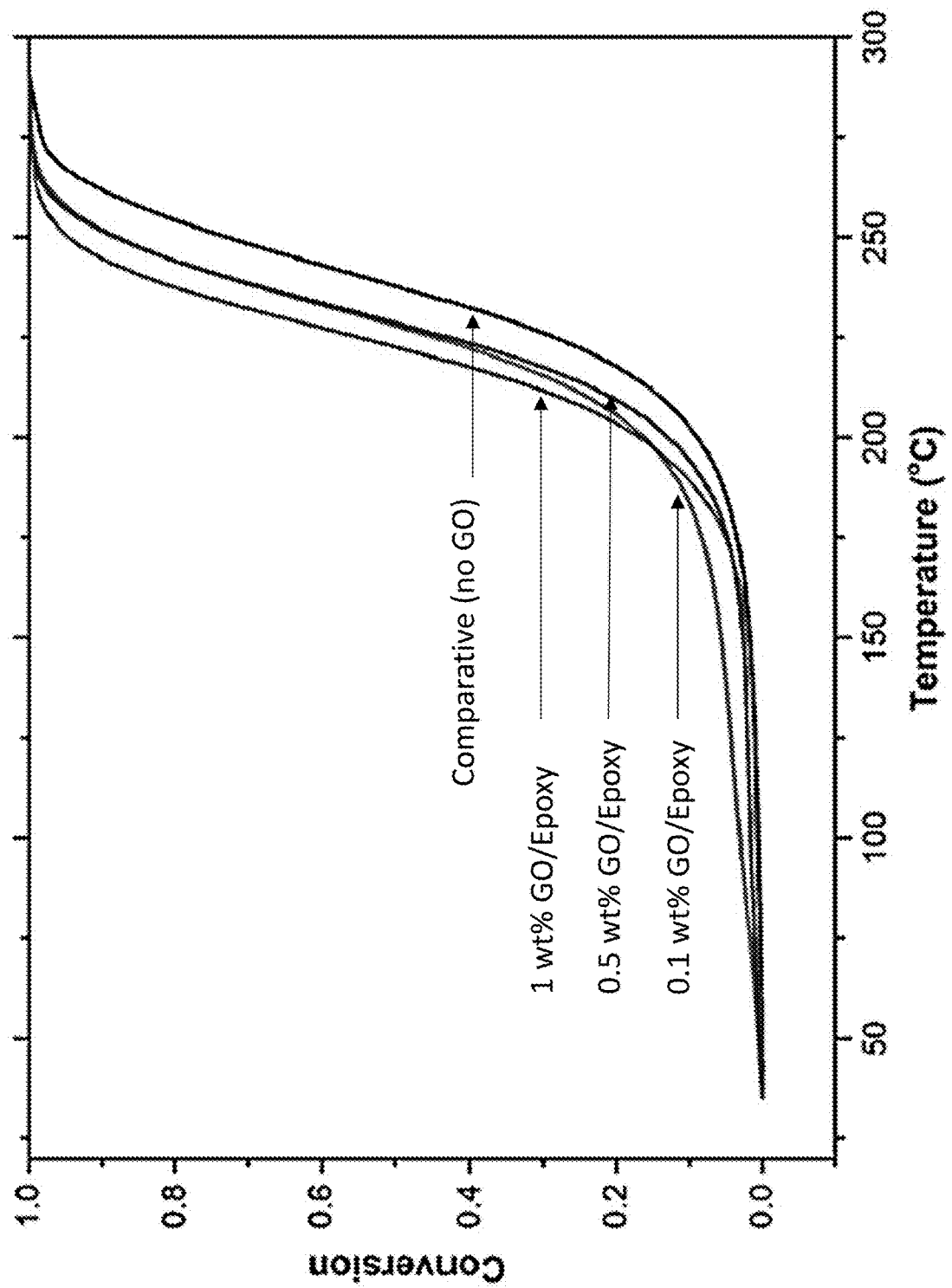
FIG. 5 is a plot of conversion of illustrative curable compositions to the cured, crosslinked state as a function of temperature using dynamic heating at 10° C./min. A comparative composition is also shown (no graphene oxide).

FIG. 5 is a plot of conversion of the curable compositions to the cured, crosslinked state as a function of temperature using dynamic heating at 10° C./min. The sample samples are shown as in FIG. 4. The results show that graphene oxide enables complete conversion at lower temperatures (i.e., smaller energy input).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A curable composition consisting of:
curable prepolymers selected from the group consisting of epoxy prepolymers and silicone prepolymers; and
unfunctionalized graphene oxide,
optionally, one or more hardeners;
optionally, one or more catalysts;
optionally, one or more further additives, wherein the total amount of the one or more additives is in a range of from 0% to 10% by weight as compared to the total weight of the curable composition; and
wherein the curable composition is in an uncured state.

2. The curable composition of claim 1, wherein the unfunctionalized graphene oxide is in the form of planar nanostructures having a thickness in a range of 1 nm to 10 nm.

3. The curable composition of claim 1, wherein the one or more hardeners are selected from the group consisting of polyfunctional amines, acids, anhydrides, phenols, alcohols, and thiols.

4. The curable composition of claim 1, wherein the composition is formulated as a two-part system comprising:
a first part containing the curable prepolymers and unfunctionalized graphene oxide; and
a second part containing the one or more hardeners.

5. The curable composition of claim 1, wherein the composition further comprises the one or more hardeners, and wherein the curable composition is formulated as a one-part system in an uncured state.

6. The curable composition of claim 1, wherein the unfunctionalized graphene oxide is present in an amount in a range of 0.1% to 10% by weight relative to the total weight of the curable composition.

7. The curable composition of claim 1, wherein the unfunctionalized graphene oxide is present in an amount in a range of 1% to 6% by weight relative to the total weight of the curable composition.

8. The curable composition of claim 1, wherein the curable prepolymers comprise at least one of bisphenol-based epoxy prepolymers and novolac-based epoxy prepolymers.

9. The curable composition of claim 1, wherein the curable prepolymers are present in an amount in a range of 40% to 90% by weight relative to the total weight of the curable composition.

10. The curable composition of claim 1, wherein the one or more hardeners are present in an amount in a range of 10% to 60% by weight relative to the total weight of the curable composition.

11. The curable composition of claim 1, wherein the one or more further additives comprises at least one of a filler, a pigment, and a viscosity modifier.

12. A curable composition consisting of:
curable prepolymers selected from the group consisting of epoxy prepolymers and silicone prepolymers; and
graphene oxide;
optionally, one or more hardeners;
optionally, one or more catalysts;
optionally, one or more further additives, wherein the total amount of the one or more additives is in a range of from 0 to 10% by weight as compared to the total weight of the curable composition,
wherein the curable composition is in an uncured state.

13. The curable composition of claim 12, wherein the curable prepolymers include epoxy prepolymers.

14. The curable composition of claim 13, including unfunctionalized graphene oxide.

15. The curable composition of claim 12, including unfunctionalized graphene oxide.

16. The curable composition of claim 12, wherein the composition is formulated as a two-part system comprising:
a first part containing the curable prepolymers and unfunctionalized graphene oxide; and
a second part containing the one or more hardeners.

17. The curable composition of claim 12, wherein the composition further comprises the one or more hardeners, and wherein the curable composition is formulated as a one-part system in an uncured state.

18. The curable composition of claim 12, wherein the one or more further additives comprises at least one of a filler, a pigment, and a viscosity modifier.

19. The curable composition of claim 12, wherein the graphene oxide forms covalent bonds with the one or more hardeners.

20. The curable composition of claim 12, wherein the graphene oxide forms non-covalent hydrogen bonds with the curable prepolymers.

* * * * *